US009454162B2

(12) United States Patent
Hyun et al.

(10) Patent No.: US 9,454,162 B2
(45) Date of Patent: Sep. 27, 2016

(54) CALIBRATION CIRCUIT AND SEMICONDUCTOR DEVICE INCLUDING THE SAME

(71) Applicant: SK hynix Inc., Gyeonggi-do (KR)

(72) Inventors: Sang-Ah Hyun, Gyeonggi-do (KR); Hyun-Woo Lee, Gyeonggi-do (KR)

(73) Assignee: SKY Hynix Inc., Gyeonggi-do (KR)

( * ) Notice: Subject to any disclaimer, the term of this patent is extended or adjusted under 35 U.S.C. 154(b) by 203 days.

(21) Appl. No.: 14/308,508

(22) Filed: Jun. 18, 2014

(65) Prior Publication Data

US 2015/0205312 A1 Jul. 23, 2015

(30) Foreign Application Priority Data

Jan. 20, 2014 (KR) ........................ 10-2014-0006688

(51) Int. Cl.
*G01N 27/416* (2006.01)
*G05F 1/46* (2006.01)

(52) U.S. Cl.
CPC .................................... *G05F 1/468* (2013.01)

(58) Field of Classification Search
CPC .......... G01R 31/3648; G01R 31/3627; G01R 31/3662; G01R 31/3631; Y02E 60/12
USPC ........................................................ 324/426
See application file for complete search history.

(56) References Cited

U.S. PATENT DOCUMENTS

| | | | | |
|---|---|---|---|---|
| 6,643,787 | B1 | 11/2003 | Zerbe et al. | |
| 2001/0050952 | A1 * | 12/2001 | Nikutta | H03K 5/135 375/224 |
| 2008/0048714 | A1 * | 2/2008 | Lee | H03K 19/0005 326/30 |
| 2008/0054981 | A1 * | 3/2008 | Hosoe | H03K 19/00384 327/333 |
| 2009/0122904 | A1 * | 5/2009 | Jang | H04L 25/028 375/286 |

FOREIGN PATENT DOCUMENTS

| | | |
|---|---|---|
| KR | 1020070075998 | 7/2007 |

* cited by examiner

*Primary Examiner* — Arun Williams
(74) *Attorney, Agent, or Firm* — IP & T Group LLP

(57) ABSTRACT

A calibration circuit includes a pad suitable for receiving calibration data that toggles, a calibration reference voltage generation unit suitable for generating a calibration reference voltage from a median value of the calibration data, a comparison unit suitable for outputting a comparison signal by comparing the calibration reference voltage and a reference voltage with each other, and a reference voltage generation unit suitable for generating the reference voltage which is calibrated based on the comparison signal.

8 Claims, 2 Drawing Sheets

CALIBRATION CIRCUIT AND SEMICONDUCTOR DEVICE INCLUDING THE SAME

CROSS-REFERENCE TO RELATED APPLICATIONS

The present application claims priority of Korean Patent Application No. 10-2014-0006688, filed on Jan. 20, 2014, which is incorporated herein by reference in its entirety.

BACKGROUND

1. Field

Exemplary embodiments of the present invention relate to a semiconductor design technology, and, more particularly, to a semiconductor device capable of performing a calibration.

2. Description of the Related Art

Data is transmitted between the constituent devices of a system via a bus. The data transmitted via the bus is digital data, which is represented by “1 (high)” and “0 (low).” An electric device recognizes the data by analyzing the combinations of “0” and “1” in a transmitted data signal.

An electric device uses a reference voltage VREF to determine if the received signal is a “1” or “0.” When the voltage of a received signal is higher than the reference voltage, the electric device recognizes the signal as “1,” and when the voltage of the received signal is lower than the reference voltage, the electric device recognizes the signal as “0.”

The value of the reference voltage is generally not optimized because the reference voltage is inputted from an external source. In order to optimize the value of the reference voltage, a memory controller unit (MCU) has to perform a write/read operation. However, it is difficult and time consuming to optimize the value of the reference voltage for each pin.

SUMMARY

Exemplary embodiments of the present invention are directed to a semiconductor device capable of calibrating a reference voltage.

In accordance with an embodiment of the present invention, a calibration circuit may include a pad suitable for receiving calibration data that toggles, a calibration reference voltage generation unit suitable for generating a calibration reference voltage from a median value of the calibration data, a comparison unit suitable for outputting a comparison signal by comparing the calibration reference voltage and the reference voltage, and a reference voltage generation unit suitable for generating the reference voltage corresponding to the comparison signal.

In accordance with another embodiment of the present invention, a semiconductor device may include a pad suitable for receiving calibration data that toggles, a calibration control unit suitable for controlling a calibration operation and a normal operation, a calibration unit suitable for generating a calibration reference voltage from a median value of the calibration data based on the calibration data inputted during the calibration operation and a reference voltage in response to the calibration reference voltage, and a buffering unit suitable for buffering and outputting normal data inputted from the pad during the normal operation in response to the reference voltage.

In accordance with another embodiment of the present invention, a method for calibrating the semiconductor device may include receiving calibration data that toggles through a pad during a calibration operation, generating a calibration reference voltage by filtering the calibration data, generating a comparison signal by comparing the calibration reference voltage and the reference voltage, and controlling the reference voltage based on the inputted comparison signal.

DETAILED DESCRIPTION

Exemplary embodiments of the present invention will be described below in more detail with reference to the accompanying drawings. These embodiments are provided so that this disclosure will be thorough and complete and will fully convey the scope of the present invention to those skilled in the art.

Figure 1:
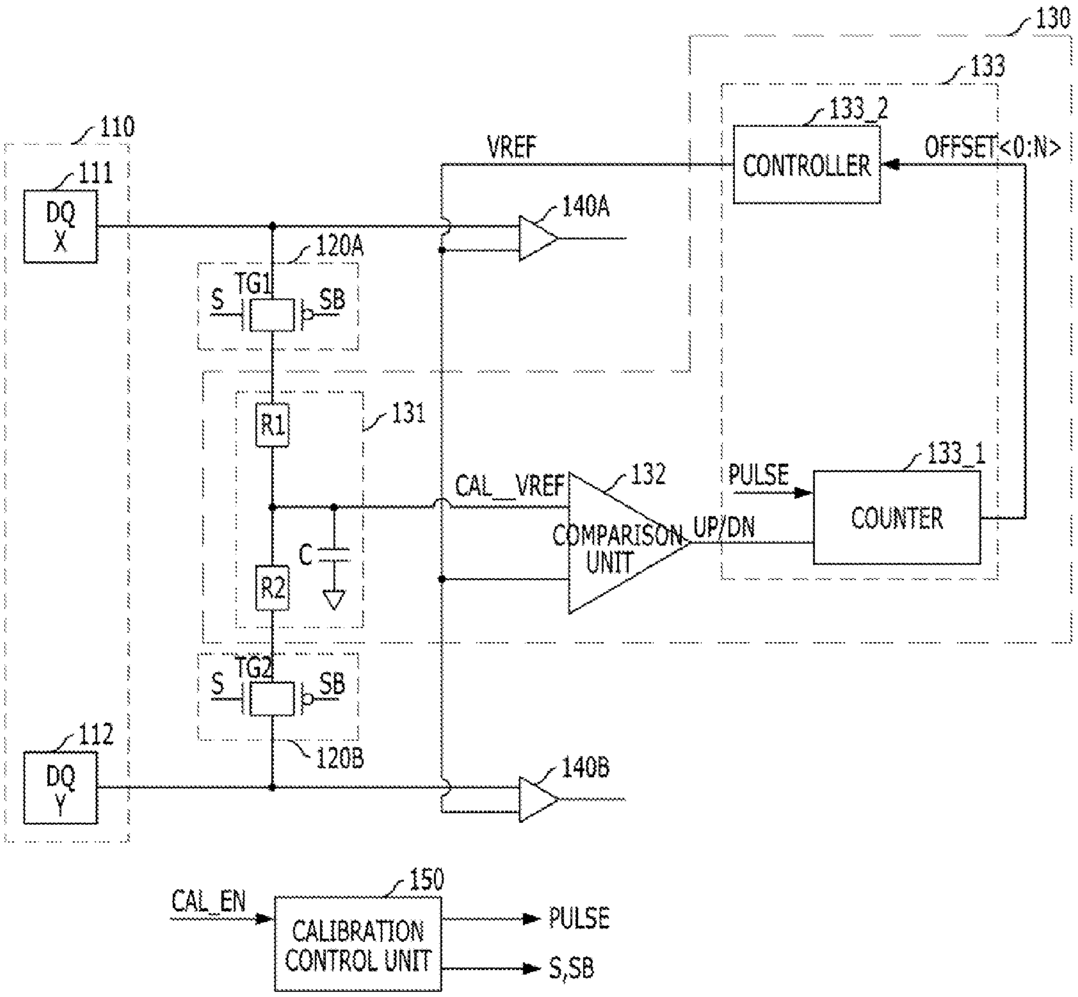
FIG. 1 is a block diagram illustrating a semiconductor device in accordance with an embodiment of the present invention.

FIG. 1 is a block diagram illustrating a semiconductor device in accordance with an embodiment of the present invention.

Referring to FIG. 1, the semiconductor device may include a plurality of data pads 110, data transmission units 120A and 120B, a calibration unit 130, buffering units 140A and 140B, and a calibration control unit 150.

The multiple data pads 110 may include a first pad 111 and a second pad 112. The first pad 111 receives a first data that toggles, and the second pad 112 receives a second data that is in a differential relationship with the first data. The first and second data is calibration data that is inputted during a calibration operation.

The data transmission units 120A and 120B may transmit the first and second data to the calibration unit 130 during the calibration operation. The data transmission units 120A and 120B may include transfer gates TG1 and TG2 and controlled by data transmission control signals S and SB that are enabled during the calibration operation to transmit the first and second data to the calibration unit 130.

The data transmission control signals S and SB may be generated by the calibration control unit 150. The calibration control unit 150 generates the data transmission control signals S and SB and a pulse signal PULSE in response to a calibration enable signal CAL_EN that is enabled during the calibration operation. The data transmission control signals S and SB control the data transmission units 120A and 120B as described above, and the pulse signal PULSE is used for controlling the calibration unit 130, which will be described below. The calibration enable signal CAL_EN may be inputted from an external source or generated through a Mode Register Set (MRS).

The calibration unit 130 may generate a calibration reference voltage CAL_VREF based on the median voltage of the first data and the second data transmitted from the data transmission units 120A and 120B during the calibration operation. The calibration unit 130 uses the calibration reference voltage CAL_VREF to generate the reference voltage VREF, which is fed back to the calibration unit 130 to serve as the basis for further calibration.

The calibration unit 130 may include a calibration reference voltage generation unit 131, a comparison unit 132, and a reference voltage generation unit 133.

The calibration reference voltage generation unit 131 may include a first resistance R1, a second resistance R2, and a capacitor C. The first resistance R1 and the second resistance R2 may have the same resistance value.

While the first and second data pass through the first and second resistances R1 and R2 and the data transmission units 120A and 120B respectively, the median value of the first and second data may be charged in the capacitor C. This is because a DC component of low frequency passes through the first and second resistances R1 and R2, and an AC component of high frequency disappears since a Low Pass Filter (LPF) operation is performed with a structure where the first and second resistances R1 and R2 and the capacitor C are coupled.

Therefore, the capacitor C is charged with the median value of the first and second data, and the charged result is the calibration reference voltage CAL_VREF.

The comparison unit 132 outputs a comparison signal UP or DN by comparing the calibration reference voltage CAL_VREF and the reference voltage VREF, which is fed back. The reference voltage VREF, which is initially inputted, is an existing default input value.

The comparison unit 132 outputs the comparison signal UP or DN including information on whether the value of the reference voltage VREF has to be increased or decreased by comparing the calibration reference voltage CAL_VREF and the reference voltage VREF.

The reference voltage generation unit 133 outputs the reference voltage VREF in response to the comparison signal UP or DN outputted from the comparison unit 132. The reference voltage VREF is then fed back to the comparison unit 132 to serve as the basis for further calibration.

The reference voltage generation unit 133 may include a counter 133_1 and a controller 133_2.

The counter 133_1 generates control signals OFFSET<0:N> for controlling the reference voltage VREF through a counting operation in response to the comparison signal UP or DN. To be specific, the counter 133_1 generates the control signals OFFSET<0:N> based on the pulse signal PULSE generated from the calibration control unit 150 in response to the comparison signal UP or DN.

For example, when up information is acquired from an existing 5-bit control signal "10000," the values of the control signals OFFSET<0:N> change to "10001," and when down information is acquired from the existing 5-bit control signal "10000," the values of the control signals OFFSET<0:N> change into "01111."

The controller 133_2 generates the reference voltage VREF in response to the control signals OFFSET<0:N>. Since the reference voltage VREF is fed back and inputted to the comparison unit 132, the aforementioned process is repeated. As a result, the value of the reference voltage VREF outputted from the controller 133_2 becomes close to the value of the calibration reference voltage CAL_VREF obtained from the first and second data.

When the reference voltage VREF comes close to the calibration reference voltage CAL_VREF, after a predetermined time passes, the calibration operation is completed and normal operation begins.

When the calibration operation is completed, the buffering units 140A and 140B buffer and output normal data inputted from the first and second pads 111 and 112 in response to the reference voltage VREF.

The first and second data may have different signaling characteristics during the calibration operation and different single ended signaling characteristics during normal operation.

Hereafter, an operation of a semiconductor device embodiment of the present invention is described.

The data transmission units 120A and 120B transmit the calibration data inputted through the first and second pads 111 and 112 to the calibration reference voltage generation unit 131 based on the data transmission control signals S and SB. The data transmission control signals S and SB that come from the calibration control unit 150 are generated in response to the calibration enable signal CAL_EN. Subsequently, the calibration reference voltage CAL_VREF is generated and inputted to the comparison unit 132.

The comparison unit 132 generates the comparison signal UP or DN by comparing the calibration reference voltage CAL_VREF and the reference voltage VREF and transmits the comparison signal UP or DN to the counter 133_1. The counter 133_1 outputs the control signals OFFSET<0:N> for controlling the reference voltage VREF based on the comparison signal UP or DN. The controller 133_2 controls and outputs the reference voltage VREF. The operation is repeated until the reference voltage VREF comes close to the calibration reference voltage CAL_VREF.

When the calibration operation is completed, the calibration enable signal CAL_EN is disabled and normal operation begins.

During normal operation of the data transmission units 120A and 120B, they are disabled by the data transmission control signals S and SB, receive normal data through the first and second pads 111 and 112, and transmit the normal data to the buffering units 140A and 140B.

The buffering units 140A and 140B buffer and output the normal data based on the controlled reference voltage VREF through the calibration operation.

Figure 2:
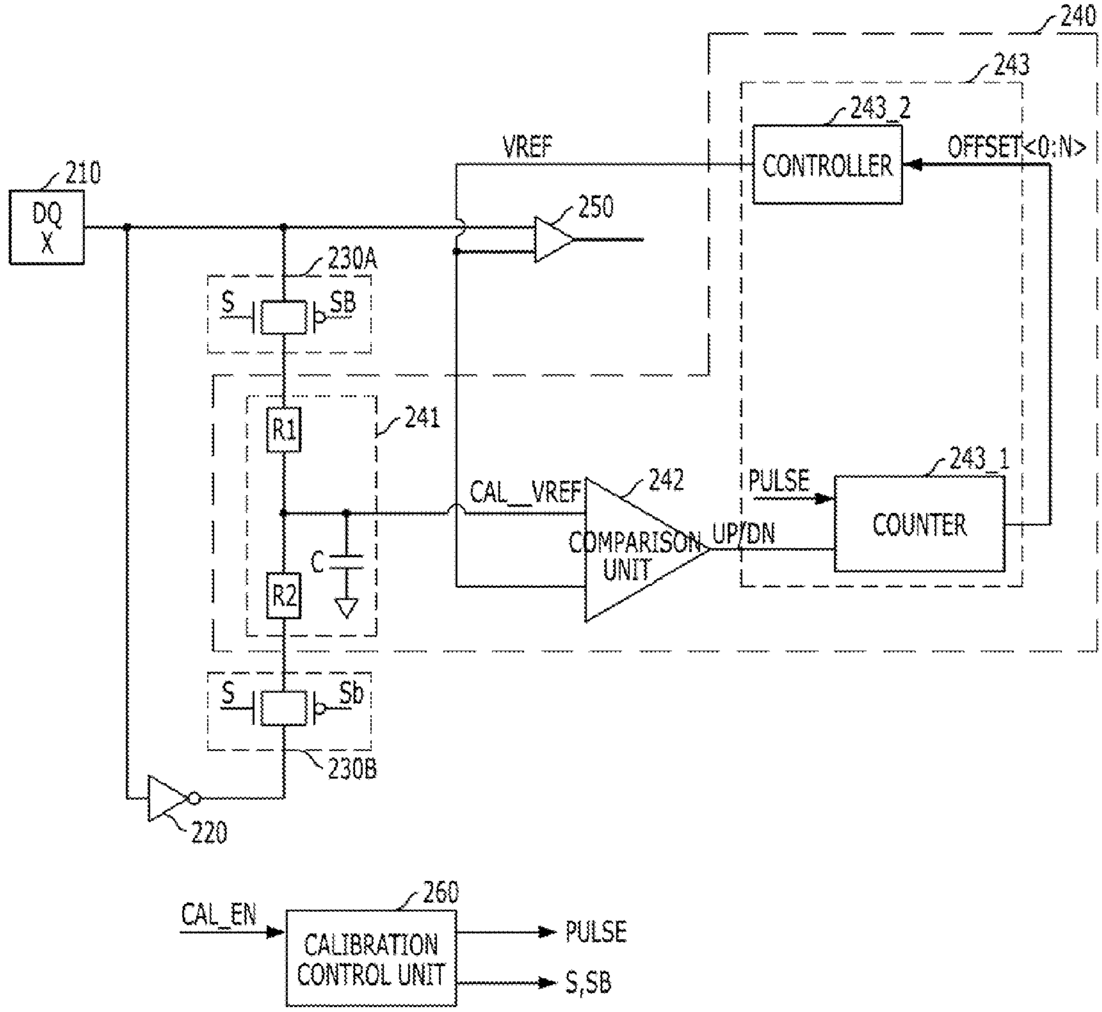
FIG. 2 is a block diagram illustrating a semiconductor device in accordance with another embodiment of the present invention.

FIG. 2 is a block diagram illustrating a semiconductor device in accordance with another embodiment of the present invention.

Referring to FIG. 2, the semiconductor device may include a data pad 210, an inverting unit 220, data transmission units 230A and 230B, a calibration unit 240, a buffering unit 250, and a calibration control unit 260.

A detailed description on the structures and operations of the data transmission units 230A and 230B, the calibration unit 240, the buffering unit 250, and the calibration control unit 260 is omitted because they are the same or similar to those of the data transmission units 120A and 120B, the calibration unit 130, the buffering unit 140A, and the calibration control unit 150 shown in FIG. 1.

The data pad 210 receives calibration data that toggles.

The inverting unit 220 inverts and outputs the calibration data. For the sake of convenience in description, the calibration data inputted through the data pad 210 is referred to as a first data, and the calibration data inverted through the inverting unit 220 is referred to as a second data.

As illustrated in FIG. 1, when the calibration data is inputted, the first and second data, in a differential relationship with each other, are inputted through the first and second pads 111 and 112 respectively. However, in FIG. 2, the calibration data is inputted through just one data pad 210 and inverted through the inverting unit 220 so that a calibration reference voltage CAL_VREF may be generated.

As a result, the semiconductor device may generate the reference voltage VREF, which is based on the calibration reference voltage CAL_VREF, which is based on the differentially inputted calibration data.

As described above, a semiconductor device in accordance with the embodiments of the present invention may perform a calibration operation on a reference voltage VREF without the control of an external device, and therefore the burden on the controller may be reduced. Additionally, an optimum reference voltage may be generated since a calibration operation is directly performed on actual data, which improves data reliability.

In short, the reliability of data may be improved by securing a stable reference voltage through a calibration operation.

While the present invention has been described with respect to the specific embodiments, it should be noted that the embodiments are for describing, not limiting, the present invention. Further, it should be noted that the present invention may be achieved in various ways through substitution, change, and modification by those skilled in the art without departing from the scope of the present invention as defined by the following claims.

What is claimed is:

1. A calibration circuit, comprising:

a pad suitable for receiving a calibration data that toggles;

a calibration reference voltage generation unit suitable for generating a calibration reference voltage from a median value of the calibration data;

a comparison unit suitable for outputting a comparison signal by comparing the calibration reference voltage and a reference voltage with each other; and a reference voltage generation unit suitable for generating the reference voltage which is calibrated based on the comparison signal, wherein the pad includes a first pad for receiving a first data and a second pad for receiving a second data, which is in a differential relationship with the first data, and the reference voltage generation unit generates the calibration reference voltage using the first and second data.

2. The calibration circuit of claim 1, wherein the reference voltage generation unit includes:

a counter suitable for generating a reference voltage control signal through a counting operation in response to the comparison signal; and a controller suitable for controlling the reference voltage in response to the reference voltage control signal.

3. A semiconductor device, comprising:

a pad suitable for receiving a calibration data that toggles;

a calibration control unit suitable for controlling a calibration operation and a normal operation;

a calibration unit suitable for generating a calibration reference voltage from a median value of the calibration data inputted during the calibration operation, and also suitable to generate a reference voltage in response to the calibration reference voltage; and a buffering unit suitable for buffering and outputting a normal data inputted from the pad during the normal operation in response to the reference voltage, wherein the pad includes a first pad for receiving a first data and a second pad for receiving a second data, which is in a differential relationship with the first data, and the calibration unit generates the calibration reference voltage using the first and second data.

4. The semiconductor device of claim 3, further comprising:

a data transmission unit suitable for transmitting the calibration data to the calibration unit based on a data transmission control signal generated from the calibration control unit.

5. The semiconductor device of claim 3, wherein the calibration unit includes:

a calibration reference voltage generation unit suitable for generating the calibration reference voltage by filtering the calibration data during the calibration operation;

a comparison unit suitable for outputting a comparison signal by comparing the calibration reference voltage and a reference voltage; and a reference voltage generation unit suitable for outputting the reference voltage which is fed back to the comparison unit and serves as a basis for further calibration.

6. The semiconductor device of claim 5, wherein the reference voltage generation unit includes:

a counter suitable for generating a reference voltage control signal through a counting operation in response to the comparison signal; and a controller suitable for controlling the reference voltage in response to the reference voltage control signal.

7. The semiconductor device of claim 5, wherein the buffering unit uses the reference voltage which is fed back.

8. The semiconductor device of claim 3, further comprising:

an inverting unit suitable for inverting the data inputted through the pad, wherein the reference voltage generation unit generates the calibration reference voltage by receiving the data inputted through the pad and the data inverted through the inverting unit.

* * * * *